US007062988B2

(12) United States Patent
Laukkanen

(10) Patent No.: US 7,062,988 B2
(45) Date of Patent: Jun. 20, 2006

(54) LOCKING OF A CONTROL DEVICE WITH A MARGIN FOR ADJUSTMENT

(75) Inventor: Mikko Laukkanen, Tampere (FI)

(73) Assignee: Etela-Suomen Autolalo Oy, Lahti (FI)

( * ) Notice: Subject to any disclaimer, the term of this patent is extended or adjusted under 35 U.S.C. 154(b) by 467 days.

(21) Appl. No.: 10/468,290

(22) PCT Filed: Mar. 6, 2002

(86) PCT No.: PCT/FI02/00175

§ 371 (c)(1),
(2), (4) Date: Aug. 19, 2003

(87) PCT Pub. No.: WO02/081249

PCT Pub. Date: Oct. 17, 2002

(65) Prior Publication Data

US 2004/0074330 A1 Apr. 22, 2004

(30) Foreign Application Priority Data

Mar. 6, 2001 (FI) ................................ 20010443

(51) Int. Cl.
*G05G 11/00* (2006.01)
*G05G 13/00* (2006.01)
*B60K 26/00* (2006.01)

(52) U.S. Cl. ........................ 74/480 R; 74/481; 74/482; 180/333

(58) Field of Classification Search ............ 74/479.01, 74/480 R, 481, 482; 180/315, 333, 332
See application file for complete search history.

(56) References Cited

U.S. PATENT DOCUMENTS 1,353,379 A * 9/1920 George et al. ................ 74/481
(Continued)

FOREIGN PATENT DOCUMENTS

DE 1020876 12/1957
DE 19715992 1/1998
(Continued)

*Primary Examiner*—Richard W. Ridley
*Assistant Examiner*—Justin Krause
(74) *Attorney, Agent, or Firm*—Venable LLP; Eric J. Franklin

(57) ABSTRACT

The invention relates to a control device for affecting the accelerator (15) of a vehicle by means of a an actuator, typically a handle (3), arranged within the reach of the driver. The main purpose of use of the invention is to modify vehicles equipped with foot pedal control means so that they become better suitable to be used by disabled persons. The invention is suitable to be used by professional drivers to improve driving comfort. According to the invention, the control device comprises means (20, 21, 30, 20, 60, 30, 20, 80, 30) for locking the actuator (3) with a margin for adjustment into a position in which the actuator (3) is utilized to affect the accelerator (15) of the vehicle, and means (22, 25, 60, 22, 25, 81) for producing a margin for adjustment in said position locked with a margin for adjustment, which margin for adjustment allows the driver to move the actuator (3) and to adjust the accelerator (15) within the adjustment range (31) of the margin of adjustment without releasing said locking. Furthermore, the control device according to the invention comprises means (20, 21, 30, 20, 60, 30, 81, 30) for automatically releasing the locking with a margin for adjustment when the driver turns the actuator (3) more than is allowed by said margin for adjustment.

15 Claims, 7 Drawing Sheets

U.S. PATENT DOCUMENTS

Figure 1:
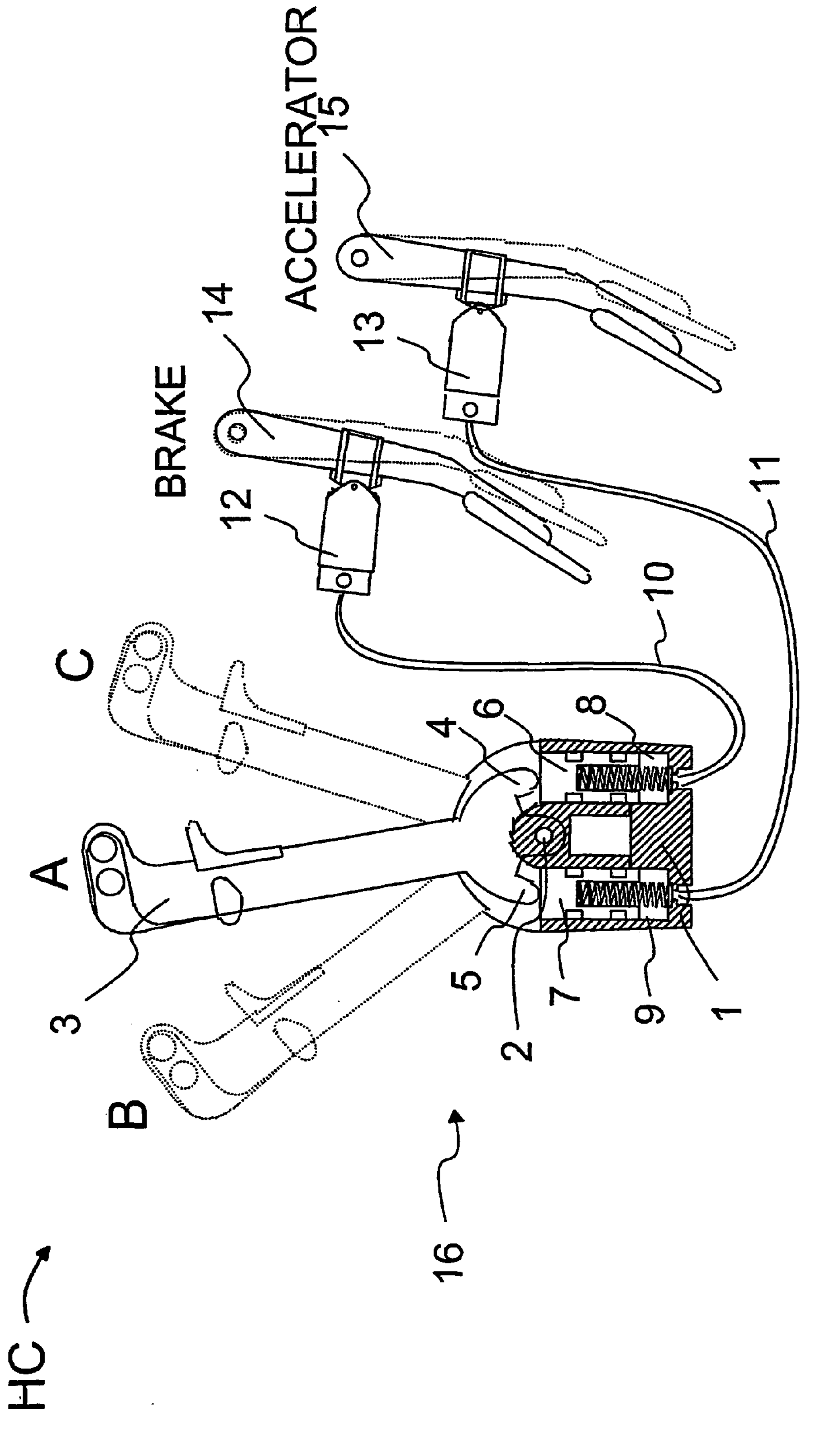

| | | | | |
|---|---|---|---|---|
| 1,479,006 | A * | 1/1924 | Peck | 74/481 |
| 3,541,880 | A | 11/1970 | Dudley | |
| 4,212,211 | A * | 7/1980 | Rickert | 74/538 |
| 5,205,184 | A | 4/1993 | Noel et al. | |
| 5,553,684 | A * | 9/1996 | Bolduc | 180/333 |
| 5,813,944 | A | 9/1998 | Grindle | |

FOREIGN PATENT DOCUMENTS

| | | |
|---|---|---|
| EP | 0738623 | 10/1996 |
| EP | 0863040 | 9/1998 |
| GB | 2288372 | 10/1995 |
| WO | 02/20297 | 3/2002 |

* cited by examiner

LOCKING OF A CONTROL DEVICE WITH A MARGIN FOR ADJUSTMENT

The invention relates to a control device according to the preamble of the appended claim 1.

An earlier patent application no. 20001987 by the applicant that was not yet public at the application date of the present application, discloses a control device to be installed in a vehicle, said control device enabling the use of the original pedal control devices of a vehicle by means of a separate actuator. Typically, the above-mentioned control device is installed in a car equipped with automatic transmission and a handle operates as an actuator, by means of which handle it is possible to affect the brake and accelerator pedals of the vehicle. By means of the aforementioned control device it is also possible for persons with significantly impaired lower limb capacity, or totally lacking said limbs or their capacity, to use a vehicle equipped with normal foot pedals.

In the solution described in the patent application no. 20001987, the force or movement exerted by the driver on the actuator of the control device is transmitted hydrostatically to the original foot pedals of the vehicle, or to mechanisms closely connected thereto.

There are also other kinds of known solutions of prior art for converting the original pedal control devices of a vehicle into hand-operated devices, thus making them suitable for persons with restricted mobility. The movement of the handle operating as an actuator can be arranged to be transferred to the original pedal/pedals or to mechanisms closely connected thereto for example by means of mechanical leverages or cables.

In such control devices that can be installed in a vehicle afterwards, and in which the actuator is a handle, the operation of the handle is typically arranged in such a manner that when the driver pushes the handle away from himself/herself in the longitudinal direction of the vehicle, the mechanism of the brake pedal is affected, and respectively, when the driver pulls the handle towards himself/herself, the mechanism of the accelerator pedal is affected.

For reasons of safety, the function of the handle or a corresponding actuator is by means of return mechanisms, for example different return springs arranged such that when the driver releases his/her grip from the handle, the handle automatically returns to such a basic position in which the control device does not substantially affect the brake or accelerator pedal. The aforementioned return mechanisms can be partly or entirely contained in the mechanisms of the original pedal devices of the vehicle.

In practical driving situations the driver has to exert a force on the handle, which force corresponds to the force produced by the aforementioned return mechanisms. For example when driving longer distances, the driver is thus forced to pull the handle towards himself/herself against the force of the return mechanisms to keep the accelerator pedal pressed down and to maintain the speed of the vehicle. Especially in longer distances this easily results in that the hand the driver uses for operating the handle grows tired, which, in turn, may even reduce traffic safety.

The hand of the driver that operates the handle is also in the above-described situation tied to its function, and thus the driver cannot for example use said hand for holding the steering wheel or use other devices of the vehicle without disturbing the driving (speed) of the vehicle. For example when driving in a queue, the driver must thus in practice keep one hand constantly on the handle of the control device. While one hand is positioned on the handle of the control device, the driver must naturally keep the other hand constantly on the steering wheel, wherein in practice, the use of both hands for operating the other control and auxiliary devices of the vehicle is prevented.

In solutions of prior art, the aim has been to reduce the aforementioned problem caused by return mechanisms which are necessary as such, by increasing the friction between the handle arranged to rotate from its lower end in relation to a shaft or the like, and said shaft. Thus, the friction produced thereby also reduces the force required for keeping the handle in a set position.

U.S. Pat. No. 5,813,944 presents a hand control device, in which the handle used by the driver is a lever arranged at its lower end to be pivotable in relation to a shaft installed in a support, the reciprocating movement of the lever being transmitted further by means of cables to the brake and accelerator pedals of the vehicle. Said patent discloses friction adjustment taking place by means of the tension of the end nut of the shaft, by means of which it is possible to adjust the force necessary for moving the handle or the operating properties of the handle.

It is an obvious problem of the aforementioned solution that the friction produced thereby complicates the movement of the handle in all situations, thus reducing the feedback feeling of the control device considerably. If the tension of the shaft is sufficiently increased so that the handle remains stationary in a set position of the accelerator, the feedback feeling of the handle is reduced, and the operation of the handle becomes easily “angular”. Thus, for example during engine braking, it is difficult for the driver to adjust the handle into such a position in which the accelerator is no longer pressed, but the brake pedal is not yet affected either. In braking situations, the friction resisting the movement of the handle complicates the accurate rationing of the braking force, and thus reduces traffic safety. If the aforementioned friction adjustment is arranged such that it can be adjusted while driving, it is necessary for the driver to resort to additional measures to change such an adjustment, which reduces traffic safety and is disadvantageous in view of the convenience of use of the control device.

It is the main purpose of the present invention to introduce a control device to be installed in a vehicle, by means of which it is possible to avoid the above-described problems related to solutions of prior art.

By means of the solution according to the invention it is possible to avoid the strain experienced by the driver in a driving situation, caused by the necessary return mechanisms contained in the control device itself and/or in the original pedal mechanisms or the like in the vehicle that are used by means of the control device. When the operating situation so requires, the actuator according to the invention, such as a handle, can however, be moved without restrictions, wherein the feedback feeling remains on a sufficient level when the original pedal mechanisms of the vehicle are affected, which is important for traffic safety.

To attain this purpose, the control device according to the invention is primarily characterized in what will be presented in the characterizing part of the independent claim 1.

The other dependent claims will present some preferred embodiments of the invention.

The invention is based on the idea that the actuator of the control device, typically a handle or the like can be locked during the use with a margin for adjustment to such a position, in which the actuator is utilized in a desired manner to affect the accelerator pedal, or other mechanisms of the vehicle relating to the pressing of the accelerator pedal. The actuator remains in said locking position with a margin for adjustment, irrespective of the effect of the above-described return mechanisms, without a force constantly exerted on the actuator by the driver.

More precisely, the locking of the actuator with a margin for adjustment means that when the locking is switched on, the actuator can be easily moved/turned by the driver within a set adjustment range (margin for adjustment) to affect the accelerator of the vehicle and to adjust the driving speed of the vehicle without having to switch off said locking. The margin for adjustment according to the invention is primarily intended for fine-adjustment of the speed of the vehicle, when for example the longitudinal profile of the road changes.

Furthermore, it is an essential feature of the locking with a margin for adjustment according to the invention that when the driver turns the actuator locked with a margin for adjustment outside a position restricted by the margin for adjustment, the locking of the actuator is automatically released. Thus, in a sudden situation, for example for emergency braking or acceleration, it is not necessary to switch off the locking with a margin for adjustment separately. When the locking is switched off, the actuator of the control device functions with the original sensitivity and without restrictions, wherein a good feedback feeling is attained for example in braking situations.

In a preferred embodiment of the invention, the locking with a margin for adjustment is implemented in a control device disclosed in an earlier Finnish patent application no. 20001987 by the same applicant. In said control device, the force or movement exerted by the driver on the actuator is transmitted hydrostatically to the original foot pedals of the vehicle, or to mechanisms closely connected thereto. When these two inventions are combined together, a control device is attained which in view of the driver is very easy to use and provides a very good feedback feeling and which can also be easily installed in different kinds of vehicles and for different kinds of drivers. Hydrostatic power transmission enables the use of flexible hoses to connect the so-called operating part of the control device to the other parts of the control device. Thus, the actuator, typically a handle that is placed in said operating part intended for the user, can be installed in a desired location in the vehicle cabin and in the desired position with respect to the steering wheel, for example on the right-hand or left-hand side of the steering wheel. Said operating part can be attached for example to the vehicle body, dashboard, steering wheel, or to the structures of a so-called steering shaft connected to the steering wheel, to the driver's seat, wheelchair functioning as a driver's seat, to the inner structures of the door of the vehicle on the driver's side, or another location best suitable in view of the vehicle and/or driver in question.

The invention is not, however, limited solely to be used in the aforementioned control device based on the earlier invention of the applicant, but it can be widely applied also in other types of control devices that are intended to be used in vehicles. The movement of the actuator can thus be arranged transferable to the accelerator pedal of the vehicle, to a mechanism closely connected thereto, or to another member effecting said function, for example by means of mechanical leverages or cables, or in another manner known as such.

Furthermore, the invention is not restricted solely to such applications in which the actuator of the control device is a handle, but the actuator can also be arranged to be used with another such body part which body part of a driver with an individually restricted mobility is best suitable for this purpose at a given time.

In the following, the most important advantages attained by means of the present invention will be shortly described.

When the solution according to the invention is used, the driver's hand (or another body part) that operates the handle of the control device (or another actuator) does not grow tired even when driving longer distances, because the driver can rest his/her hand, if desired, and easily change his/her grip on the handle, if necessary. This is especially important if the driver has restricted mobility, wherein in addition to the restrictions in the capacity of the lower limbs, the capacity and efficiency of the other parts of the driver's body and/or upper limbs may be weaker than normal.

The driver can use the hand intended for the handle of the control device also for steering by means of the steering wheel, or for another purpose, wherein the invention also considerably facilitates the use of other control and auxiliary devices (indicator switch, light switch, heating apparatus, radio, etc.) of the vehicle. By steering the vehicle by the steering wheel momentarily by means of the hand intended for the handle of the control device, the other hand of the driver becomes free from the handling of the steering wheel for other purposes. Thus, the user can also change the grip of said other hand and/or rest said other hand while driving.

Thus, the control device equipped with the feature according to the invention efficiently prevents the driver from growing strained or tired, wherein the driver's ability to concentrate and his/her alertness remains good, and thus traffic safety is improved.

The actuator of a control device according to the invention has a simple and reliable structure, and it can be implemented with small costs in control devices installed afterwards in vehicles of different types. The solution according to the invention is not, however, restricted solely to control devices installed afterwards in vehicles, but the control device according to the invention can also be installed in a vehicle as original equipment, if necessary.

The following more detailed description of the invention will more clearly illustrate for anyone skilled in the art, possible embodiments of the invention as well as advantages to be achieved with the invention in relation to prior art.

Figure 5:
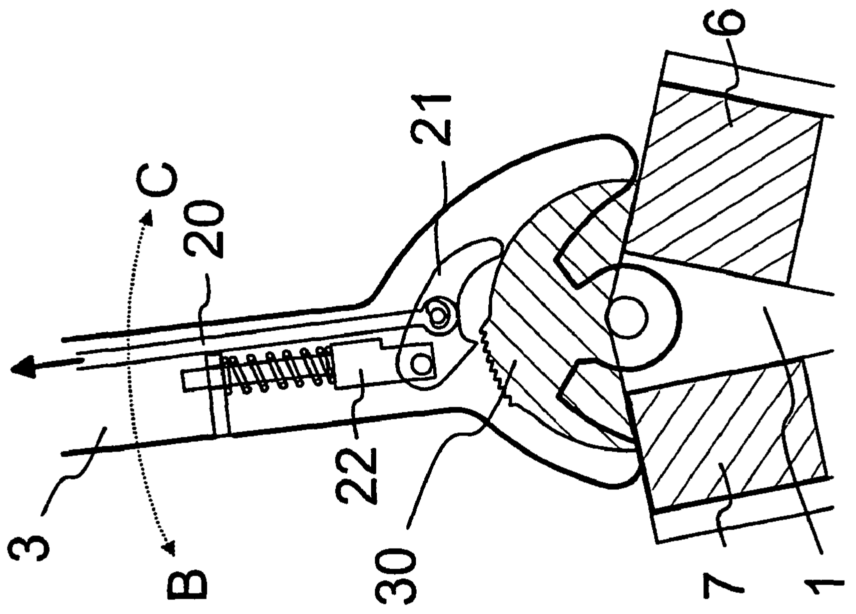
Figure 7:
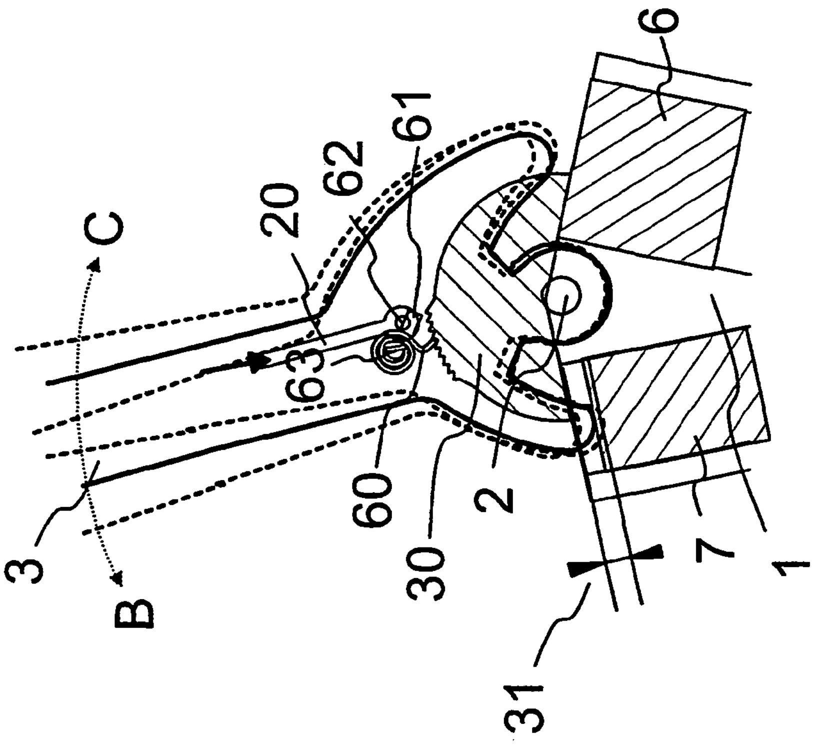
Figure 6:
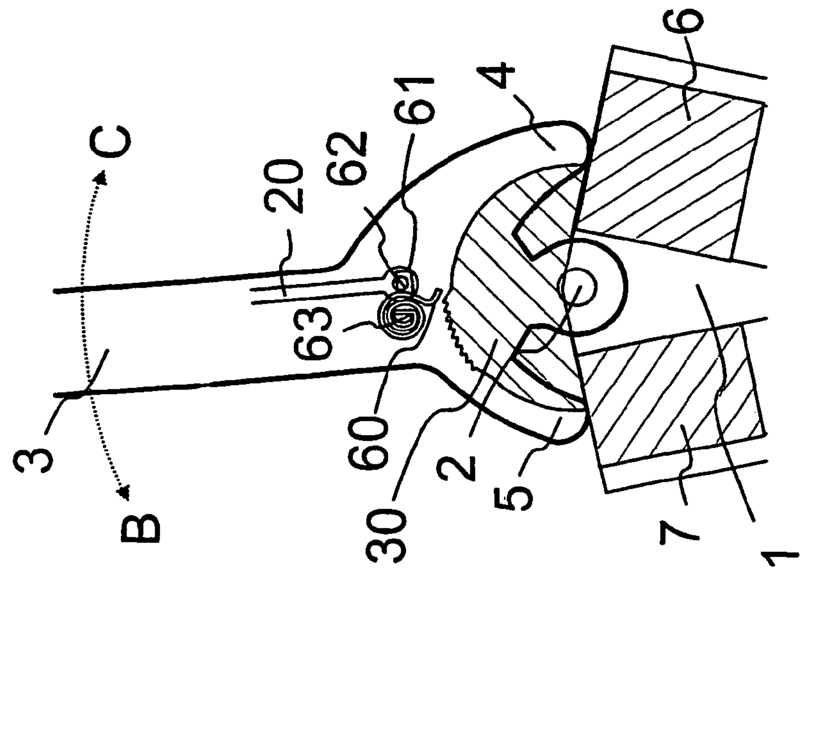
Figure 10:
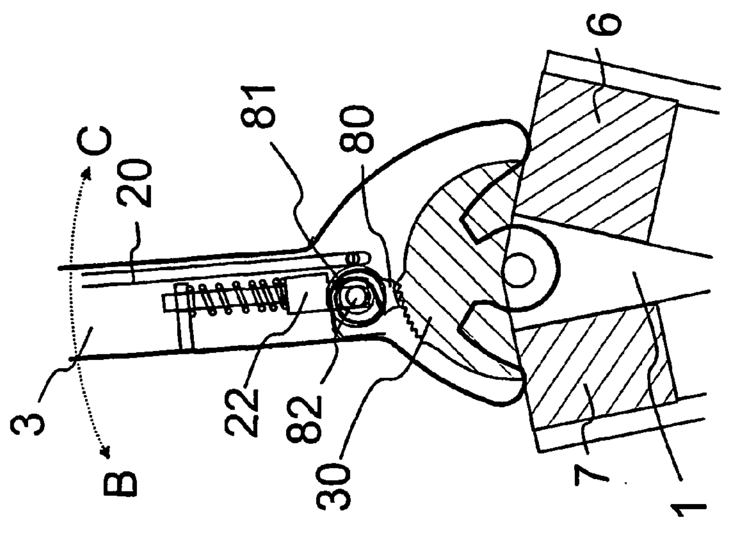
Figure 9:
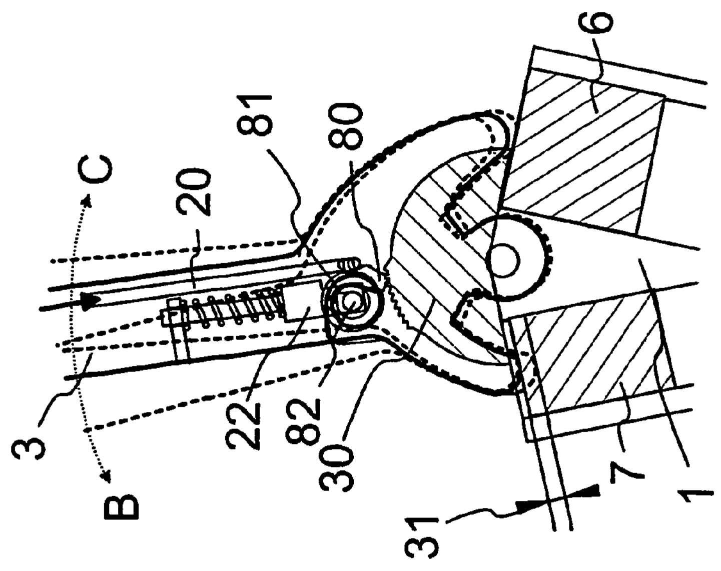
Figure 8:
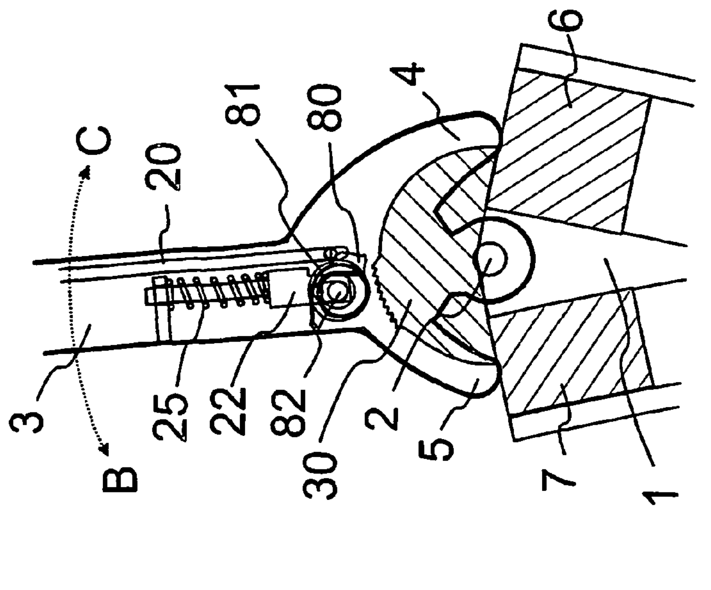
Figure 11:
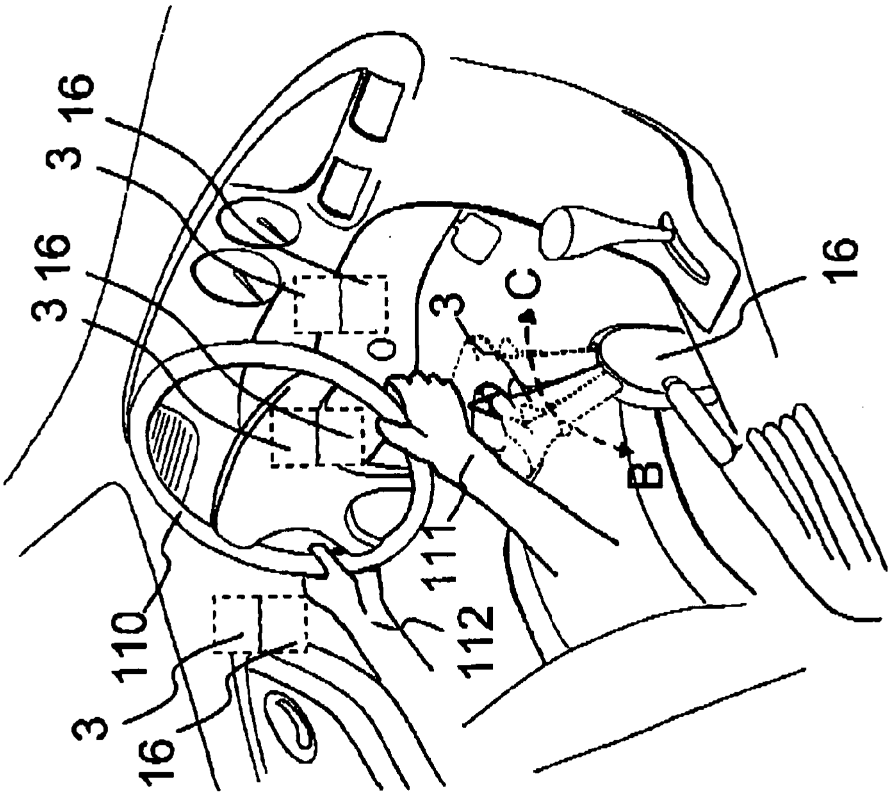
Figure 13:
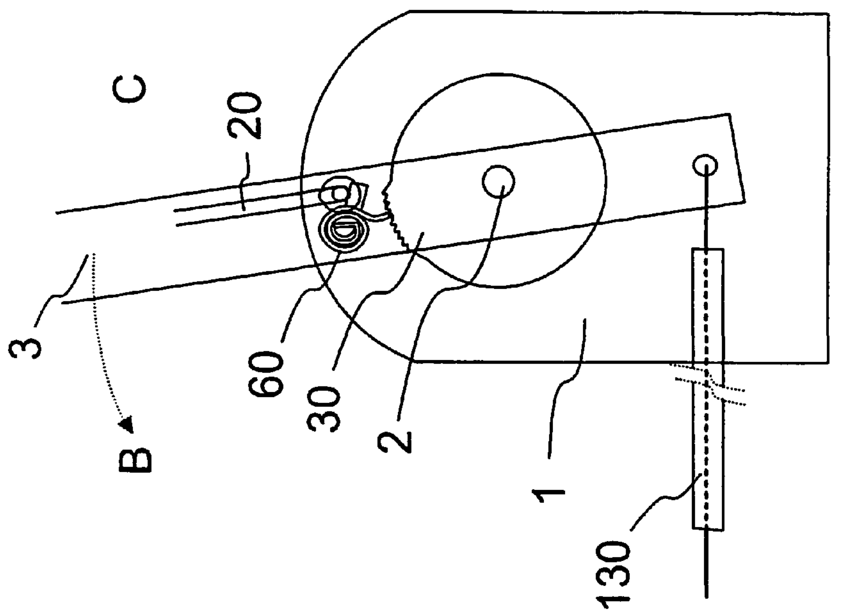
Figure 12:
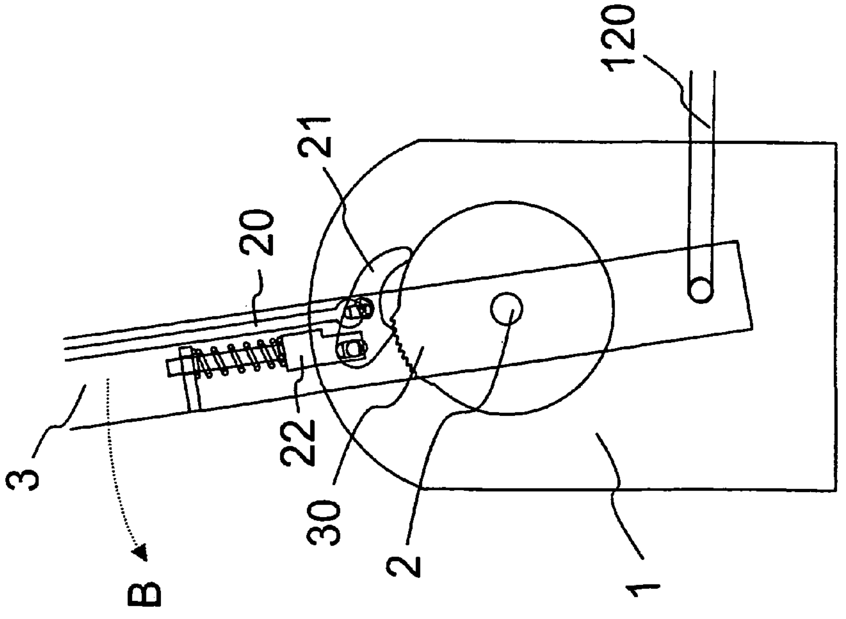

In the following, the invention will be described in more detail with reference to the appended drawings, in which FIG. 1 shows in principle an embodiment of the control device disclosed in the earlier Finnish patent application No. 20001987 by the applicant, FIGS. 2 to 5 illustrate in principle a first embodiment of the invention, FIGS. 6 to 7 illustrate in principle a second embodiment of the invention, FIGS. 8 to 10 illustrate in principle a third preferred embodiment of the invention, FIG. 11 illustrates the placement of the operating part and actuator of the control device according to the invention in the cabin of a vehicle, FIG. 12 illustrates in principle a fourth preferred embodiment of the invention, and FIG. 13 illustrates in principle a fifth embodiment of the invention.

FIG. 1 shows in principle a preferred embodiment of a control device according to the earlier Finnish patent application No. 20001987 by the applicant.

In FIG. 1, the operating part 16 of the control device HC comprises an actuator 3 arranged pivotable at its lower end in relation to a shaft 2. In this embodiment the actuator 3 is a handle. The handle 3 affects piston means 6,7 by press means 4, 5 connected thereto, when the handle 3 is pivoted in relation to the shaft 2 and at the same time in relation to the body of the operating part 1. Said piston means 6, 7 are located in hydraulic cylinders 8, 9 arranged in the body 1. Said so-called first hydraulic cylinders 8,9 are coupled by means of pipes 10,11 to so-called second hydraulic cylinders 12,13 fixed close to the pedal mechanisms 14,15 in the vehicle. When the handle 3 in FIG. 1 is moved towards the position B of the handle, the accelerator pedal 15 of the vehicle is affected, and in a corresponding manner, when the handle 3 is moved towards the position C, the brake pedal 14 is affected.

When the driver releases his/her grip from the handle 3, the handle 3 returns into its basic position A because of return mechanisms, said return mechanisms being included in this case both in the original pedal mechanisms 14, 15 of the vehicle and in the control device HC itself. In the control device HC, the return mechanisms in this embodiment are return springs included in the first 8,9 and second 12, 13 hydraulic cylinders, of which the former are shown in FIG. 1. Furthermore, the handle 3 can also be equipped with a separate return member, such as a return spring, or the like, arranged in connection with the shaft 2.

When using a control device HC according to FIG. 1, the driver has to exert a force on the handle 3 or a corresponding actuator, which force substantially corresponds to the force produced by the aforementioned return mechanisms.

The situation is also similar in control devices of prior art with a substantially corresponding purpose of use, in which the power transmission between the handle and the pedal mechanisms is implemented for example mechanically by using different lever, rod and/or cable transmissions. The return mechanisms returning the handle or another actuator into its basic position are absolutely necessary for the sake of traffic safety in all control devices of this kind, and thus, the strain caused by the same for the driver also occurs during the use of all corresponding control devices.

In the following, different embodiments of the control device according to the invention will be described, by means of which the strain and inconveniences caused by the aforementioned return mechanisms for the driver can be avoided without making the function of the handle rigid in a manner that hampers the use and/or traffic safety.

FIGS. 2 to 5 illustrate in principle the structure and function of an operating part 16 and an actuator 3 of the control device according to a first embodiment of the invention in a situation in which the invention is applied substantially in a control device according to FIG. 1.

Figure 2:
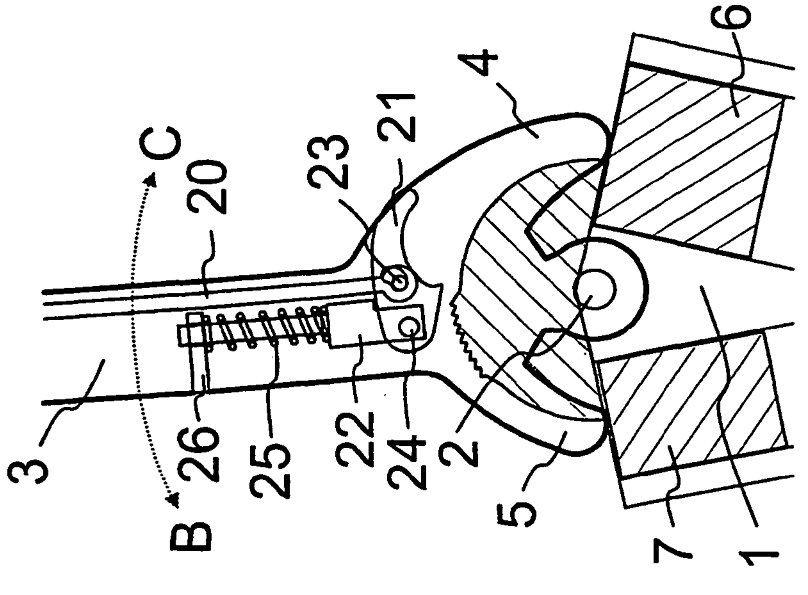

In the initial situation shown in FIG. 2, the adjustment of the handle 3 with a margin for adjustment according to the invention is not in use. Thus, the handle 3 can be moved freely with respect to the shaft 2 in directions B and C with respect to the body 1 of the operating part to affect the piston means 6 or 7, and further the pedal mechanisms 14, 15 of the vehicle. In the situation of FIG. 2, the means used for the locking with a margin for adjustment, that is a push bar 20, a latch 21 and a spring mechanism 22, are in a rest position, to which rest position said means 20, 21, 22 are pulled by the push bar 20 with a return member, such as a spring (not shown in FIGS. 2 to 5) located at the upper end of said push bar.

The push bar 20 and the latch 21 are connected to each other with a shaft journal 23, and the latch 21 and the spring mechanism 22 are further connected to each other with a shaft journal 24. The spring mechanism 22 that comprises a spring 25 is attached inside the handle 3 by using a fastener 26. The free ends of the shaft journals 23 and 24 that are positioned outside the means 20, 21, 22, are arranged to move in grooves (not shown in FIGS. 2 to 5) produced inside the body of the handle 3, substantially in the longitudinal direction of the handle.

In the following FIGS. 3 to 5, the reference numbering used for referring to parts and members, corresponds to the markings used in FIG. 2, and thus, for the sake of clarity, all markings have not been repeated in FIGS. 3 to 5.

Figure 3:
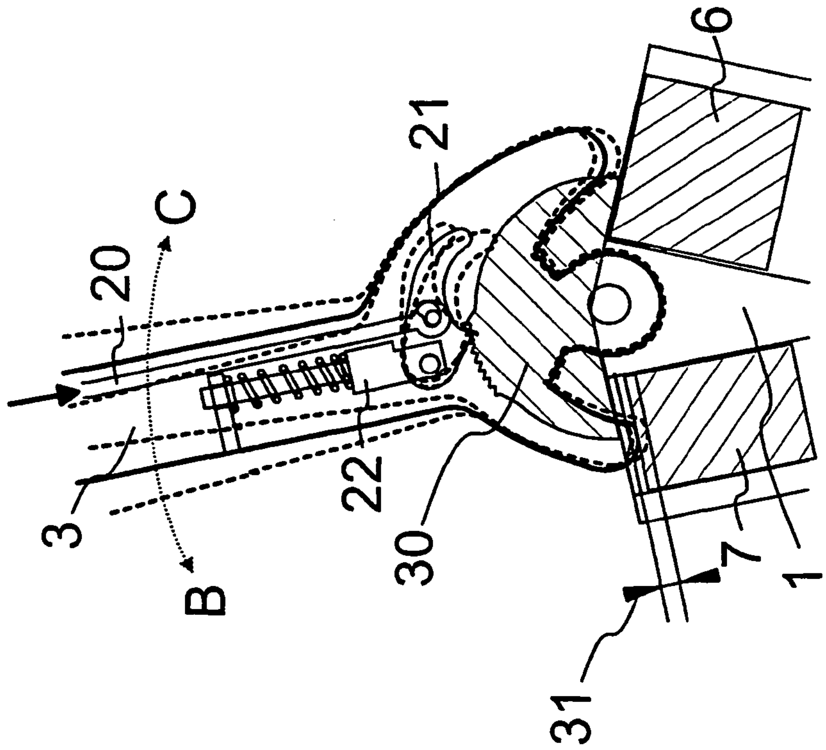

In FIG. 3, the driver has turned the handle 3 in the direction B and adjusted the driving speed into a suitable level by affecting the piston means 7, and thereby the accelerator pedal 15 (see FIG. 1). In this situation the handle is in the position shown with a solid line in FIG. 3. By pressing the push rod 20 now downwards in the direction shown by the arrow with a lever, knob or the like located at the upper end of the handle 3, the driver can lock the handle 3 to the aforementioned position with a margin for adjustment.

The locking with a margin for adjustment according to the invention takes place when the latch 21 is locked behind a tooth located in a suitable position on a toothed rim 30 fixed to the body 1 of the operating part in a stationary manner. When the shaft journal 24 functions as a pivot point, the return member (not shown in FIGS. 2 to 5) positioned at the upper end of the push rod 20 secures the locking of the latch 21 on the toothed rim 30 by tending to pull the push rod 20 upwards towards the rest position. The profile of the teeth on the toothed rim 30 is shaped asymmetrically in the direction of motion of the handle 3 for the aforementioned purpose in a manner that is obvious for a man skilled in the art and is suitable for the aforementioned purpose. When the position of the handle 3 is locked in the above-described manner, the driver can release his/her grip entirely from the handle 3, if necessary, without changing the position of the handle 3 itself.

In the situation of FIG. 3, the margin for adjustment in the locking is produced by means of the spring mechanism 22 in the following manner. When the locking is switched on, it is now possible to move the handle 3 a fixed distance either in the direction B or C in such a manner that the latch 21 still remains locked behind the same specific tooth of the toothed rim 30 as the spring mechanism 22 yields slightly and keeps the handle 3 in the position desired at a given time by means of the counterforce it has produced. In FIG. 3, the margin for adjustment produced according to the invention is illustrated by means of extreme positions of the handle 3 and the latch 21 that are marked with broken lines. The aforementioned extreme positions enable the movement of the piston means 7 that affects the position of the accelerator pedal in the adjustment range 31 shown in FIG. 3.

Figure 4:
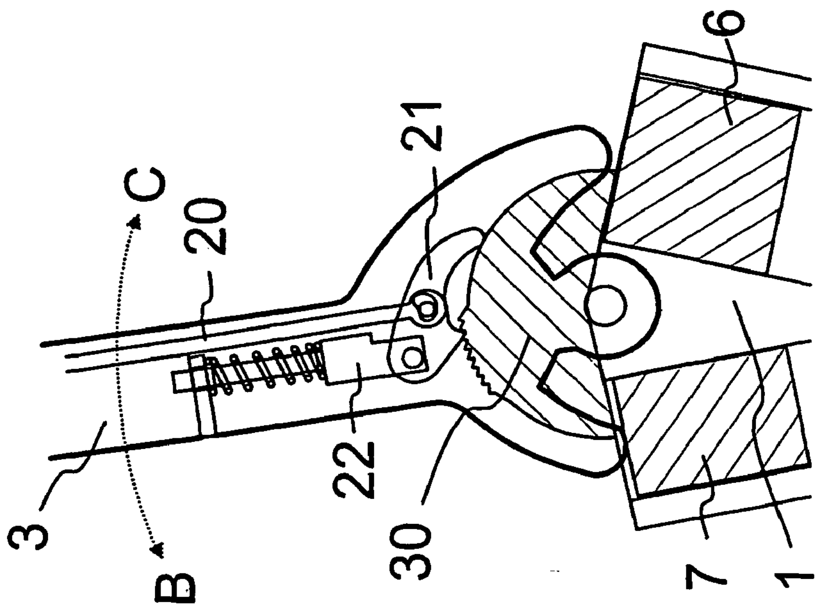

FIG. 4 shows the extreme position of the margin for adjustment when the handle is turned in the direction C to reduce the acceleration until the tip of the latch 21 touches the body of the toothed rim 30 in said extreme position. When the driver turns the handle 3 further in the direction C, as shown in FIG. 5, the tip of the latch 21 that touches the body of the toothed rim 30 functions as a pivot point, in relation to which the latch 21 turns as the spring mechanism 22 yields upwards, and the latch 21 is released from behind the tooth of the toothed rim 30. When the latch 21 is released, the return member placed at the upper end of the push rod 20 (not shown in FIGS. 2 to 5) pulls the locking members 20, 21, 22 back to the rest position according to FIG. 1. In other words, when the driver reduces acceleration beyond the level allowed by the margin for adjustment, or when he/she suddenly shifts to braking, the locking with a margin for adjustment according to the invention is automatically released, and the situation according to FIG. 1 is restored.

When the locking with a margin for adjustment is switched on and the driver turns the handle in the direction B to increase acceleration (e.g. FIG. 3), thus, when the handle 3 is turned in this direction more than is allowed by the margin for adjustment, the latch 21 is released from behind the tooth of the toothed rim 30, wherein the return member placed at the upper end of the push rod 20 pulls the locking members 20, 21, 22 back to the rest position shown in FIG. 1. In other words, when the driver increases acceleration beyond the level allowed by the margin for adjustment for example when he/she is forced to accelerate rapidly in a suddenly occurring situation, the locking with a margin for adjustment according to the invention is automatically released. If, however, in the embodiment of the invention shown in FIGS. 2 to 5, the driver when increasing acceleration at the same time pushes the push rod downwards, the latch 21 is locked again behind a tooth located at a suitable point in the toothed rim 30.

According to FIGS. 2 to 5, the locking with a margin for adjustment according to the invention cannot be switched on in a braking situation, in other words in a situation in which the handle 3 is turned in the direction B in such a manner that the piston means 6 and thereby the pedal mechanism 14 of the vehicle (see FIG. 1) are affected. This is arranged by means of the shaping of the toothed rim 30 in such a manner that when the handle 3 is in such a position in which the piston means 6 is affected, there are no teeth on the toothed rim 30 within the range of the latch that would be suitable for the locking.

FIGS. 6 to 7 illustrate in principle the structure and function of an operating part 16 and an actuator 3 of a control device according to a second embodiment of the invention in a manner corresponding to FIGS. 5 to 7.

In FIG. 6, the locking of the handle 3 with a margin for adjustment is not in use, and the members used for the locking with a margin for adjustment, i.e. a push bar 20 and a spring latch 60 are in a rest position, to which rest position said members 20, 60 are pulled by the push bar 20 with a return member, such as a spring (not shown in FIGS. 6 to 7) located at the upper end of the same. The push rod 20 and the spring latch 60 are connected to each other by means of a lever member 61. Said lever member 61 and the push bar 20 are connected to each other by means of a shaft journal 62, and the lever member 61 and the spring latch 60 are further connected to each other with a shaft journal 63. The latter shaft journal 63 also operates as a swivelling shaft in relation to which the spring latch 60 is capable of turning from the rest position to the position implementing the locking with a margin for adjustment, transferred thereto by the push rod 20. The free ends of the shaft journal 62 that are positioned outside the members 20, 61, are arranged to move in grooves (not shown in FIGS. 6 to 7) produced inside the body of the handle 3, substantially in the longitudinal direction of the handle. Correspondingly, the free ends of the shaft journal 63 are arranged to rotate in grooves (not shown in FIGS. 6 to 7) produced inside the body of the handle 3.

FIG. 7 shows in a manner corresponding to FIG. 3 the act of producing the margin for adjustment of the locking according to the invention by means of the spring latch 60. When the driver pushes the push rod 20 downwards towards in the direction shown by the arrow, the handle 3 is locked in its position with a margin for adjustment as the tip of the spring latch 60 is locked behind a tooth located at a suitable point on the toothed rim 30. The margin for adjustment 31 is now produced by the yielding of the tip part of the spring latch 60 made of spring steel or another material suitable for the purpose. When the handle 3 is turned more in the direction B or C than is allowed by the margin for adjustment 31, the tip of the spring latch 60 is released from the toothed rim, and the members used for locking with a margin for adjustment, i.e. the push rod 20 and the spring latch 60 are returned to the rest position shown by FIG. 6, when pulled by the return member located at the upper end of the push bar 20.

FIGS. 8 to 10 illustrate in principle the structure and function of an operating part 16 and an actuator 3 of a control device according to a third embodiment of the invention in a manner corresponding to FIGS. 5 to 7.

In FIG. 8, the locking of the handle 3 with a margin for adjustment according to the invention is not in use, and the members used for locking with a margin for adjustment, i.e. a push bar 20, a lever latch 80, a torsional spring 81 and spring mechanism 22 are in a rest position. The push bar 20 is pulled to the rest position shown in FIG. 8 by a return member, for example a return spring (not shown in FIGS. 8 to 10), located at the upper end of the push bar 20. To support the push bar 20, the ends of a guide pin 82 located at the lower end of said push bar 20 are arranged to move in grooves (not shown in FIGS. 8 to 10) produced inside the body of the handle 3, substantially in the longitudinal direction of the handle. The lever latch 80 is connected to the spring mechanism 22 with a shaft journal 82. The lever latch 80 is restored to the rest position shown in FIG. 8 by means of a torsional spring 81 that is arranged to rotate the lever latch 80 in relation to the shaft journal 82. The free ends of the shaft journal 82 are arranged to move in grooves (not shown in FIGS. 8 to 10) produced inside the body of the handle 3, substantially in the longitudinal direction of the handle. It should be noted that in this embodiment the push rod 20 and the lever latch 80 are not attached to each other.

FIG. 9 shows in a manner corresponding to FIGS. 3 and 7 the act of producing the margin for adjustment of locking according to the invention by means of the spring latch 80. When the driver pushes the push rod 20 downwards towards in the direction shown by the arrow, the handle 3 is locked in its position with a margin for adjustment, as the tip of the spring latch 80 is locked behind a tooth located at a suitable point on the toothed rim 30. When the driver ceases to push the push bar 20 downwards, the push bar is immediately restored back to the rest position shown in FIG. 8, pulled by the return member located at the top of the push bar 20.

In the drawing, the margin for adjustment of locking is produced by means of the spring mechanism 22 in the following manner. When the locking is switched on, it is now possible to move the handle 3 either in the direction B or C as shown by the broken lines in such a manner that the lever latch 80 still remains locked behind the same set tooth on the toothed rim 30, and the spring mechanism 22 yields slightly, keeping the handle 3 by means of the counterforce it has produced at the same time in the position desired at a given time in the adjustment range 31 of the movement of the piston means 7.

When the handle 3 is turned further in the direction B or C than allowed by the margin for adjustment 31, the tip of the lever latch 80 is released from the toothed rim 30, and the lever latch 80 returns to the rest position shown by FIG. 8, being turned thereto by the torsional spring 81. In a corresponding manner, when the handle 3 is turned further in the direction B than allowed by the margin for adjustment 31, the lever latch 80 is finally turned to the position shown in FIG. 10, in which the lever latch 80 is because of its shape not capable of preventing the movement with respect to the toothed rim 30. When the handle 3 is turned further in the direction B in the situation according to FIG. 10, the toothless area of the toothed rim 30 is reached, wherein the lever latch 80 is capable of returning back to the rest position shown in FIG. 8, being turned thereto by the torsional spring 81.

FIG. 11 illustrates an advantageous placement of the operating part 16 of the control device and the handle 3 functioning as an actuator in a vehicle cabin, to be operated by the right hand 111 of the driver. The locking of the handle 3 with a margin for adjustment according to the invention provides the driver with the possibility to use his/her right hand 111, if necessary, also for steering by means of the steering wheel 110 or for another purpose. Thus, the invention also considerably enhances the use of other control or auxiliary devices of the vehicle. By steering the vehicle momentarily with the steering wheel 110 by the hand 111 intended for the actuator 3 of the control device, the other hand 112 of the driver becomes free for other tasks, and the driver can also change his/her grip and/or rest said other hand 112 during driving.

When the operating part 16 and the actuator 3 are installed suitably close to the steering wheel 110, it is possible for the driver to fine-adjust the speed of the vehicle for example when driving longer distances by moving the actuator 3 that is locked with a margin for adjustment with the edge of his/her hand 111 and or with his/her wrist according to FIG. 11, keeping both hands 111, 112, however, at the same time on the steering wheel 110. In practical test drives of the device according to the invention, it has been found that this is a very functional solution that clearly improves traffic safety and reduces the strain of the driver especially when driving longer distances. In a suddenly occurring situation, for example in panic braking or rapid acceleration, the driver can rapidly grasp the actuator 3 and turn it without delay in the direction B or C and the locking with a margin of adjustment according to the invention is simultaneously released, wherein the actuator 3 is capable of moving freely, keeping a good feedback feeling to the pedal control devices of the vehicle.

Furthermore, the locking of the actuator of a control device with a margin for adjustment according to the invention can be used merely as a hand-operated accelerator with a margin for adjustment, to further replace for example a conventional cruise controller. FIGS. 12 and 13 show embodiments of the invention suitable for this purpose, in which the movement of the handle 3 is transmitted mechanically to the mechanism of the accelerator pedal of the vehicle by means of a push bar or the like (FIG. 12) or a cable or the like (FIG. 13). It is, of course obvious that said transmission can also be implemented by means of the above-presented hydrostatic power transmission by omitting the members necessary for affecting the accelerator pedal in the device.

In FIG. 12, a push bar 120 is connected to the lower end of the handle 3, below the same with respect to the shaft 2. Furthermore, the push bar 120 is arranged to be connected to the accelerator pedal or to mechanisms closely connected thereto by a suitable manner that is obvious for anyone skilled in the art, so that when the handle is turned in the direction B, the push bar 90 (or the members connected thereto) press the accelerator pedal, thus increasing acceleration. The function of the members implementing the locking with a margin for adjustment according to the invention, i.e. the push bar 20, the latch 21, and the spring mechanism 22 in relation to the toothed rim 30, corresponds to the examples above.

In FIG. 13, a cable 130 is attached to the lower end of the handle 3, below the same with respect to the shaft 2. Furthermore, the cable 130 is arranged to be connected to the accelerator pedal or to mechanisms closely connected thereto by a suitable manner that is obvious for anyone skilled in the art, so that when the handle is turned in the direction B, the cable 130 (or the members connected thereto) pull the accelerator pedal downwards, thus increasing acceleration. The function of the members implementing the locking with a margin for adjustment according to the invention, i.e. the push bar 20 and the spring latch 60, in relation to the toothed rim 30, corresponds to the examples above.

When compared to a conventional cruise controller, it is a considerable advantage of the embodiments of the invention illustrated above in FIGS. 12 and 13 that the solution according to the invention can also be used at slow speeds, for example in slowly proceeding rush-hour traffic. In such situations it is typically not possible to use normal electric or other conventional cruise control mechanisms of prior art, because for example for safety reasons the active speed range of the same is typically restricted so that it begins at speeds of over 50 to 60 km/h. In speeds lower than the above-mentioned speed, the coupling to the function of conventional cruise controllers is typically entirely prevented, or the use of the same for this purpose is rather clumsy, because in practice, the speed must be constantly fine-adjusted. By means of the control device according to the invention it is very easy to fine-adjust the speed by using the handle 3 in the above-described manner.

The use of the invention for implementation of a control device functioning as a mere hand-operated accelerator is also possible in such cases in which the driver is capable of using the original brake pedal of the vehicle normally by means of a foot, but the use of the accelerator pedal by means of a foot is in longer distances not possible at all, or is problematic due to the tiring of the foot etc.

In addition to the control devices intended for persons with restricted mobility, it is also possible to implement the invention in control devices intended for professional drivers, such as taxi drivers or truck drivers to increase the driving comfort. Such control devices can contain only the aforementioned hand-operated accelerator with a margin for adjustment that replaces a cruise controller, or also a function enabling the use of brakes, if necessary.

It is, of course, obvious for anyone skilled in the art that by combining, in different ways the modes of operation and structures presented above in connection with different embodiments of the invention, it is possible to provide various embodiments of the invention in accordance with the spirit of the invention. Therefore, the above-presented examples must not be interpreted as restrictive to the invention, but the embodiments of the invention can be freely varied within the scope of the inventive features presented in the claims hereinbelow.

It is important to note that the locking with a margin for adjustment according to the invention is also officially acceptable to be used in traffic. Generally, this does not apply to all mechanically implemented solutions, because the solutions used therein, such as for example friction locking of the control device, may prevent unrestrained use of the control device for example in an emergency situation.

The invention claimed is:

1. Control device for affecting an accelerator of a vehicle by means of an actuator arranged within reach of a driver, wherein the control device comprises means for locking the actuator with a margin for adjustment into a locked position in which position the actuator is utilized to affect the accelerator of the vehicle, and means for producing a bi-directional margin for adjustment in said locked position, which margin for adjustment allows the driver to move the actuator bi-directionally within the adjustment range of the margin for adjustment and to adjust the accelerator without releasing said locking, and further means to release the locking with a margin for adjustment automatically when the driver turns the actuator outside said margin for adjustment.

2. The control device according to claim 1, wherein the means for locking the position of the actuator is attached to the actuator in a flexible manner to produce a bi-directional margin for adjustment for the actuator.

3. The control device according to claim 1, which control device comprises an operating part arranged within the reach of the driver, said operating part further comprising an actuator, wherein a body of the operating part of the control device comprises a toothed rim for locking the position of the actuator with a bi-directional margin for adjustment in relation to said body or the like.

4. The control device according to claim 3, wherein the actuator of the control device comprises a locking member, which said locking member is arranged to be locked behind a tooth on the toothed rim when activated by the driver, to lock the position of the actuator with a bi-directional margin for adjustment in relation to the toothed rim, thus maintaining the accelerator of the vehicle pressed down.

5. The control device according to claim 4, wherein said locking member is a latch, a flexible spring latch or a lever latch.

6. The control device according to claim 4, wherein said locking member is attached in a flexible manner to the actuator to produce a bi-directional margin for adjustment for the actuator in a situation in which the locking member is locked behind a set tooth on the toothed rim.

7. The control device according to claim 6, wherein when the driver turns the actuator outside the adjustment range in either direction determined by the bi-directional margin for adjustment, said locking member is arranged to be released from the toothed rim.

8. The control device according to claim 1, wherein the same control device also comprises means for affecting brakes of the vehicle.

9. The control device according to claim 1, wherein the control device comprises means for transmitting movement and force, exerted by the driver with his/her own muscular strength on an actuator of the control device, hydrostatically to the foot pedal control device/devices of the vehicle or to mechanisms connected thereto.

10. The control device according to claim 1, wherein the control device comprises means for transmitting movement and force, exerted by the driver with his/her own muscular strength on an actuator of the control device, by means of a mechanical lever/leverage and/or cable transmission to the foot pedal control device/devices of the vehicle or to mechanisms connected thereto.

11. The control device according to claim 1, wherein the actuator of the control device that is intended for the driver is a handle, said handle comprising a lever, a knob or another corresponding member intended for the driver for switching on the locking with a bi-directional margin for adjustment.

12. The control device according to claim 11, wherein the handle is arranged to affect the accelerator of the vehicle when the driver moves/turns the handle in a first direction, and the actuator is arranged to affect the brakes of the vehicle when the driver turns/moves the handle in the opposite direction.

13. The control device according to claim 1, wherein the actuator and/or operating part of the control device is attached in the vehicle cabin within the reach of the driver into the driver's seat.

14. The control device according to claim 1, wherein the actuator and/or operating part is/are attached in the vehicle cabin within the reach of the driver on the door of the vehicle on the driver's side.

15. The control device according to the claim 1, wherein the actuator and/or operating part is/are attached in the vehicle cabin within the reach of the driver on the steering wheel or to the structures of the control shaft connected to the steering wheel.

* * * * *